(12) United States Patent
Kim et al.

(10) Patent No.: US 7,183,019 B2
(45) Date of Patent: Feb. 27, 2007

(54) NEGATIVE ACTIVE MATERIAL COMPOSITION FOR A RECHARGEABLE LITHIUM BATTERY, METHOD OF PRODUCING A NEGATIVE ELECTRODE FOR A RECHARGEABLE LITHIUM BATTERY USING THE SAME, AND RECHARGEABLE LITHIUM BATTERY FABRICATED USING THE SAME

(75) Inventors: Chang-Seob Kim, Cheonan (KR); Ju-Hyung Kim, Busan (KR); Un-Sick Park, Seongnam (KR)

(73) Assignee: Samsung SDI Co., Ltd., Suwon-si (KR)

( * ) Notice: Subject to any disclaimer, the term of this patent is extended or adjusted under 35 U.S.C. 154(b) by 510 days.

(21) Appl. No.: 10/371,299

(22) Filed: Feb. 21, 2003

(65) Prior Publication Data
US 2003/0170534 A1 Sep. 11, 2003

(30) Foreign Application Priority Data
Mar. 6, 2002 (KR) .................... 10-2002-0011952

(51) Int. Cl.
*H01M 4/58* (2006.01)

(52) U.S. Cl. .................. 429/231.8; 429/231.9; 429/231.95; 429/223; 429/224; 429/248; 429/249; 429/212; 429/215

(58) Field of Classification Search ........... 429/231.8, 429/231.9, 231.95, 223, 224, 248, 249, 212, 429/215
See application file for complete search history.

(56) References Cited

U.S. PATENT DOCUMENTS

| | | |
|---|---|---|
| 4,360,572 A | 11/1982 | Chua et al. |
| 6,168,885 B1 * | 1/2001 | Narang et al. ............ 429/214 |
| 6,613,475 B2 * | 9/2003 | Fauteux et al. ............ 429/215 |
| 6,790,555 B2 * | 9/2004 | Kolb et al. ................ 429/59 |
| 6,927,001 B1 | 8/2005 | Hamamoto et al. |
| 2001/0009744 A1 * | 7/2001 | Kim et al. ................ 429/326 |

FOREIGN PATENT DOCUMENTS

| | | |
|---|---|---|
| CN | 1274956 | 11/2000 |
| CN | 1277468 | 12/2000 |
| CN | 1317843 | 10/2001 |
| CN | 1330417 | 1/2002 |
| JP | 11-214001 | 8/1999 |
| JP | 2001-43900 | 2/2001 |
| JP | 2001-52709 | 2/2001 |
| WO | WO 02/01665 A1 | 6/2001 |

OTHER PUBLICATIONS

Patent Abstracts of Japan for publication No. 11-214001, date of publication of Aug. 6, 1999 in the name of T. Suzuki et al.

X. Zhong-yu et al, "Research progress on the compatibility of electrolytes with Li-carbon intercalation anodes in lithium-ion batteries Part II The relation between electrolyte composition and the compatibility of electrolytes with carbon negative electrodes"; Chinese Journal of Power Sources; vol. 24, No. 5, Oct. 2000, pp. 295-301.

Patent Abstracts of Japan for Publication No. 2001-043900; Date of publication of application Feb. 16, 2001, in the name of Eric S. Kolb et al.

Patent Abstracts of Japan for Publication No. 2001-052709; Date of publication of application Feb. 23, 2001, in the name of Makurin Michael et al.

* cited by examiner

*Primary Examiner*—Bruce F. Bell
(74) *Attorney, Agent, or Firm*—Christie, Paker & Hale, LLP

(57) ABSTRACT

Disclosed is a negative active material composition for a rechargeable lithium battery, a method of producing a negative electrode for a rechargeable lithium battery using the same, and a rechargeable lithium battery using the same. The negative active material composition includes a negative active material, an additive capable of forming a surface electrolyte interface film on a negative electrode during charge and discharge, a binder, and an organic solvent.

6 Claims, 1 Drawing Sheet

NEGATIVE ACTIVE MATERIAL COMPOSITION FOR A RECHARGEABLE LITHIUM BATTERY, METHOD OF PRODUCING A NEGATIVE ELECTRODE FOR A RECHARGEABLE LITHIUM BATTERY USING THE SAME, AND RECHARGEABLE LITHIUM BATTERY FABRICATED USING THE SAME

CROSS REFERENCE TO RELATED APPLICATION

This application claims priority of Application No. 2002-11952, filed in the Korean Intellectual Property Office on Mar. 6, 2002, the disclosure of which is incorporated herein by reference.

FIELD OF THE INVENTION

The present invention relates to a negative active material composition, a method of producing a negative electrode rechargeable lithium battery using the same and a rechargeable lithium battery fabricated using the same, and more particularly, to a negative active material composition which is capable of preventing generation of gas, a method of preparing a negative electrode for a rechargeable lithium battery using the composition, and a rechargeable lithium battery fabricated using the composition.

BACKGROUND OF THE INVENTION

When a rechargeable lithium battery is charged, a potential gap between a positive electrode and a negative electrode occurs at initial charging. Such potential gap allows a surface of the negative electrode to react with an electrolyte, thereby producing a solid electrolyte interface (SEI) film on the surface of the negative electrode. The SEI film helps to intercalate and deintercalate lithium ions into the negative electrode. However, decomposition of the electrolyte, which is a side reaction simultaneously occurs, which generates gas, thereby raising the internal pressure of the battery. As a result, a swelling phenomenon occurs in which the battery thickens, the battery capacity is reduced, and it is difficult to produce various types of batteries in rectangular shapes because of the distortion.

Therefore, various attempts to prevent gas generation have been attempted.

One, attempt involves adding to the electrolyte an additive that has previously decomposed. This reduces the amount of generated gas, but the effects are insufficient because the reaction between the additive and the negative electrode occurs unevenly because of the morphology of the porous negative electrode. Furthermore, the additive concentrates on a surface of the negative electrode and actively contacts the electrolyte so that lithium metal deposit on the surface of the negative electrode by an over potential thereof. This causes an abrupt deterioration of battery performance factors such as cycle life and high-rate and low-temperature characteristics. This also makes it difficult to form the SEI film on the surface of the negative electrode, and it causes the battery to be unstable.

Another attempt involves gas removal by initial-charging a battery under an inert atmosphere. However, this method has a shortcoming in that it is not economical due to additional equipment for initial charging being required.

SUMMARY OF THE INVENTION

In one embodiment, the invention is directed to a negative active material composition for a rechargeable lithium battery including a negative active material, an additive, a binder, and an organic solvent. The additive is capable of forming a solid surface interface film on a surface of a negative electrode during charge and discharge. The negative active material comprises a carbonaceous material.

The present invention also provides a method of preparing a negative electrode for a rechargeable lithium battery. In this method, the additive, the binder, the negative active material, and the organic solvent are mixed to prepare the negative active material composition, and the composition is coated on a current collector.

The present invention is also directed to a rechargeable lithium battery including the negative electrode with the additive and the negative active material, a positive electrode with a lithiated intercalation positive active material, and an electrolyte.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
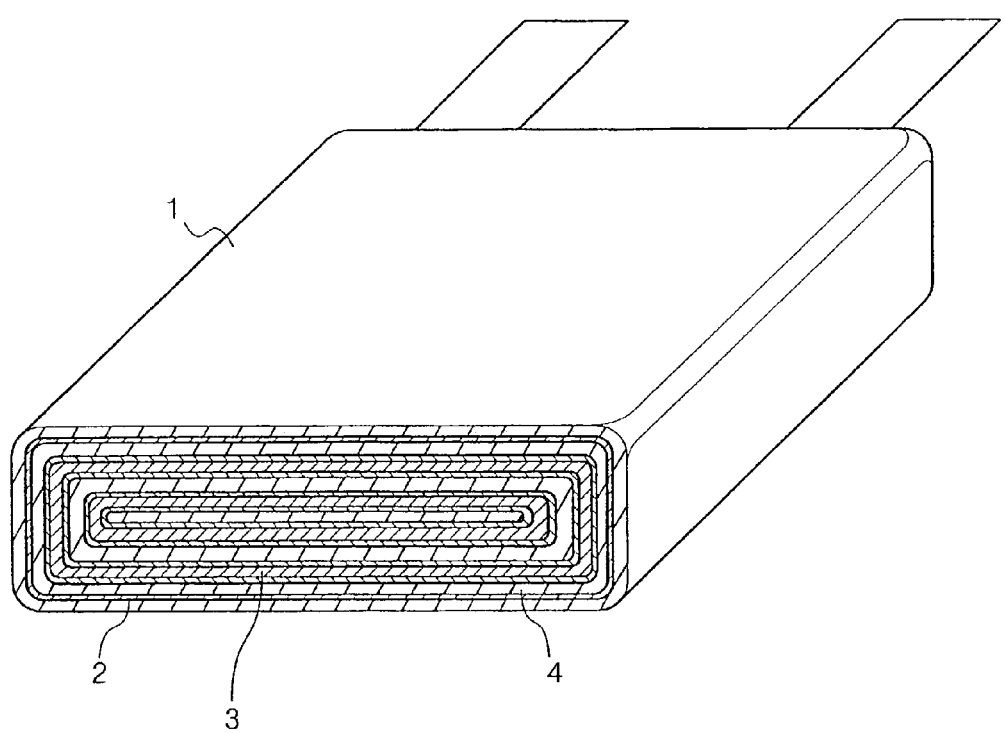
FIG. 1 shows a rechargeable lithium battery according to an embodiment of the present invention.

Reference will now be made in detail to the present embodiments of the present invention, examples of which are illustrated in the accompanying drawing and specific examples. The embodiments are described below in order to explain the invention by referring to the figure and the specific examples.

The present invention relates to prevention of a swelling phenomenon caused by gas generation, which is a side reaction of SEI film production. Such gas generation occurs due to the reaction between a surface of the negative electrode and an electrolyte when a battery is initially charged to form an SEI film on the surface of the negative electrode.

Conventionally, in order to solve this shortcoming, use of an additive (gas generation inhibitor) has been attempted, but the additive causes a deterioration of battery performance.

The present invention employs a material that can form an SEI film on a surface of the negative electrode during initial charging without gas generation and deterioration of the battery performance.

Such a material (hereinafter referred to as an "additive") may include a compound with S or P, or a carbonate-based compound. The compound with S or P includes a S=O bond or a P=O bond in its molecular structure. Examples of the compound with S or P include vinyl sulfone, $SO_2$ gas, and 1,3-propanesultone, and an example of the carbonate-based compound is vinylene carbonate. Alternatively, a compound containing the SEI film components may be used. The additive, when added to a negative active material composition, prevents the reaction between the surface of the negative electrode and the electrolyte at initial charging, thereby inhibiting gas generation, which results in the prevention of an increase in thickness of the battery and a decrease in capacity.

The negative active material composition of the present invention includes one or more carbonaceous materials, which are known as negative active materials. That is, any compound that advances an electrochemical redox reaction and in which intercalation and deintercalation of lithium ions reversibly occurs, may be used, examples of which include amorphous carbon and crystalline carbon. The amorphous carbon may be soft carbon, hard carbon, a mesophase pitch carbonized material, or coke. The crystalline carbon may be shapeless, plate-shaped, flake-shaped, globular, or fiber-type natural graphite or artificial graphite.

The negative active material composition includes an organic solvent. The organic solvent may be any solvent known in the related art, such as N-methyl pyrrolidone. The amounts of the solvent and the negative active material are not critical in the present invention, but should be sufficient to provide a suitable viscosity so that the composition is readily coated on the current collector.

The negative active material composition may further include a binder to adhere the active material to the current collector. The binder can be any conventional binder used for a conventional negative active material composition as long as the binder is soluble in the solvent used. An example of the binder is polyvinylidene fluoride.

A method for preparing a negative electrode using the composition will be described.

An additive is admixed with an organic solvent, and a binder is added to the resulting mixture, thereby obtaining a binder liquid. A negative active material is added to the binder liquid to prepare a negative active material composition. The amounts of the solvent and the negative active material are not critical in the present invention, but should be sufficient to provide a suitable viscosity so that the composition is readily coated on the current collector.

The negative active material composition is coated on a current collector to produce a negative electrode in which a negative active mass (a mixture of the negative active material, the binder, and the additive) is formed on the current collector. The amount of the additive is preferably 0.01 to 1.0 wt % based on the weight of the negative active mass.

Using the negative electrode, a positive electrode, a separator, and an electrolyte, a rechargeable lithium battery is fabricated according to any procedure known in the related art.

In one embodiment, the positive electrode includes a lithiated intercalation compound positive active material, and the lithiated intercalation compound is selected from compounds represented by formulas 1 to 12:

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xCo_{1-y}M_yA_2 \quad (4)$$

$$Li_xCo_{1-y}M_yO_{2-z}X_z \quad (5)$$

$$Li_xNi_{1-y}M_yA_2 \quad (6)$$

$$Li_xNi_{1-y}M_yO_{2-z}X_z \quad (7)$$

$$Li_xNi_{1-y}Co_yO_{2-z}X_z \quad (8)$$

$$Li_xNi_{1-y-z}Co_yM_zA_\alpha \quad (9)$$

$$Li_xNi_{1-y-z}Co_yM_zO_{2-\alpha}X_\alpha \quad (10)$$

$$Li_xNi_{1-y-z}Mn_yM_zA_\alpha \quad (11)$$

$$Li_xNi_{1-y-z}Mn_yM_zO_{2-\alpha}X_\alpha \quad (12)$$

where $0.9 \leq x \leq 1.1$, $0 \leq y \leq 0.5$, $0 \leq z \leq 0.5$, $0 \leq \alpha \leq 2$; M is at least one element selected from the group consisting of Al, Ni, Co, Mn, Cr, Fe, Mg, Sr, V, and rare earth elements; A is selected from the group consisting of O, F, S, and P; and X is selected from the group consisting of F, S, and P.

The electrolyte includes a supporting salt and an organic solvent. The supporting salt may be any salt as long as it activates the movement of lithium ions between the positive electrode and the negative electrode. Examples thereof include lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), and mixtures thereof. The organic solvent may be a cyclic carbonate, such as ethylene carbonate or methylene carbonate, or a linear carbonate, such as dimethyl carbonate, diethyl carbonate, ethylmethyl carbonate, or methylpropyl carbonate.

A rechargeable lithium battery according to an embodiment of the present invention is shown in FIG. 1 and includes a case 1 containing a positive electrode 3, a negative electrode 4, and a separator 2 interposed between the positive electrode 3 and the negative electrode 4. However, it is understood that other lithium batteries can be constructed using the positive active material according to the present invention.

The following examples illustrate the present invention in further detail. However, it is understood that the present invention is not limited by these examples.

EXAMPLE 1

0.22 wt % of vinyl sulfone was added to 39.91 wt % of N-methyl pyrrolidone. They were mixed for approximately 10 minutes to completely dissolve vinyl sulfone in N-methyl pyrrolidone. 3.59 wt % of a polyvinylidene fluoride binder was added to the resulting mixture and mixed to prepare a binder liquid. 56.28 wt % of a graphite negative active material was added to the binder liquid to prepare a negative active material slurry. Thereafter, bubbles that were generated in the slurry were removed therefrom, and the resulting material was shaken and aged for approximately 10 hours. As a result, a negative active material slurry was prepared.

The slurry was coated on a Cu current collector in a predetermined thickness and dried at 150° C. to evaporate N-methyl pyrrolidone, thereby producing a negative electrode. The dried collector was pressed and cut, followed by vacuum drying at 150° C. for 10 minutes to remove any remaining N-methyl pyrrolidone from the collector.

Using the negative electrode, a $LiCoO_2$ positive electrode, and a polypropylene film separator, an ICP503465A-type rechargeable lithium cell was fabricated. As an electrolyte, 1M $LiPF_6$ in ethylene carbonate and diethyl carbonate was used.

COMPARATIVE EXAMPLE 1

3.6 wt % of a polyvinylidene fluoride binder was added to 40 wt % of N-methyl pyrrolidone and mixed to prepare a binder liquid. 56.4 wt % of a graphite negative active material was added to the binder liquid to prepare a negative active material slurry. Thereafter, bubbles that were generated in the slurry were removed therefrom, and the resulting material was shaken and aged for approximately 10 hours. As a result, a negative active material slurry was prepared.

The slurry was coated on a Cu current collector in a predetermined thickness and dried at 150° C. to evaporate N-methyl pyrrolidone, thereby producing a negative electrode. The dried collector was pressed and cut followed by vacuum drying at 150° C. for 10 minutes to remove any remaining N-methyl pyrrolidone from the collector.

Using the negative electrode, a LiCoO$_2$ positive electrode, and a polypropylene film separator, an ICP503465A-type rechargeable lithium cell was fabricated. As an electrolyte, 1M LiPF$_6$ in ethylene carbonate and diethyl carbonate was used.

The rechargeable lithium cells according to Example 1 and Comparative Example 1 were charged, and the thickness of the cells were measured before and after charging. The thickness of the cell according to Comparative Example 1 increased by 0.8 mm after charging, but the thickness of the cell according to Example 1 only increased by 0.3 mm before and after charging. It can be seen from these results that the additive used in Example 1 effectively represses swelling so that the increase in the thickness is reduced to less than 38% of that of the conventional electrode.

COMPARATIVE EXAMPLE 2

3.6 wt % of a polyvinylidene fluoride binder was added to 40 wt % of N-methyl pyrrolidone and mixed to prepare a binder liquid. 56.4 wt % of a graphite negative active material was added to the binder liquid to prepare a negative active material slurry. Thereafter, bubbles that were generated in the slurry were removed therefrom, and the resulting material was shaken and aged for approximately 10 hours. As a result, a negative active material slurry was prepared.

The slurry was coated on a Cu current collector in a predetermined thickness and dried at 150° C. to evaporate N-methyl pyrrolidone, thereby producing a negative electrode. The dried collector was pressed and cut followed by vacuum drying at 150° C. for 10 minutes to remove any remaining N-methyl pyrrolidone from the collector.

Using the negative electrode, a LiCoO$_2$ positive electrode, a polypropylene film separator, and an electrolyte, an ICP503465A-type rechargeable lithium cell was fabricated. The electrolyte was prepared by adding vinyl sulfone to a mixed organic solvent (ethylene carbonate and diethyl carbonate) in which 1M LiPF$_6$ was dissolved. The amount of vinyl sulfone was 0.75 wt % based on the mixed organic solvent.

The cells according to Example 1 and Comparative Example 2 were charged and the thicknesses of the cells were measured before and after charging. The increases in the thickness of the cells according to Example 1 and Comparative Example 2 were identically about 0.3 mm. However, when the negative electrode according to Comparative Example 1 was separated from the charged cell, the surface of the negative electrode was found to be entirely covered with lithium metal, which results in the deterioration of low-temperature discharge, high-rate discharge, and cycle life characteristics. However, when the negative electrode according to Example 1 was separated from the charged cell, no lithium metal was found on the surface of the negative electrode. Thus, even though the cells according to Example 1 and Comparative Example 1 had similar swelling repression effects, the cell according to Example 1 retained its battery performance, but the cell according to Comparative Example 1 had deteriorated battery performance.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material composition comprising:
   a negative active material comprising a carbonaceous material;
   an additive capable of forming a solid electrolyte interface film on a negative electrode during charge and discharge, wherein the additive is vinyl sulfone;
   a binder; and
   an organic solvent.

2. A method of producing a negative electrode for a rechargeable lithium battery comprising:
   mixing a negative active material, a binder, an organic solvent, and an additive capable of forming a solid electrolyte interface film on a negative electrode during charge and discharge to prepare a negative active material composition, wherein the additive is vinyl sulfone;
   coating the negative active material composition on a current collector; and
   drying the coated current collector.

3. The method of claim 2, wherein the amount of the additive is 0.01 to 1.0 wt % based on the total weight of the negative material, the binder, and the additive.

4. A rechargeable lithium battery comprising:
   a negative electrode comprising a negative active material comprising a carbonaceous material, a binder and an additive capable of forming a solid electrolyte interface film on the negative electrode during charge and discharge, wherein the additive is vinyl sulfone;
   a positive electrode comprising a lithiated intercalation positive active material; and an electrolyte.

5. The rechargeable lithium battery of claim 3, wherein the amount of the additive is 0.01 to 1.0 wt % based on the total weight of the negative active material, the binder and the additive.

6. The rechargeable lithium battery of claim 3, wherein the positive active material is selected from the group consisting of compounds of Formulas 1 to 12:

$$Li_xMn_{1-y}M_yA_2 \qquad (1)$$

$$Li_xMn_{1-y}M_yO_{2-z}X_z \qquad (2)$$

$$Li_xMn_2O_{4-z}X_z \qquad (3)$$

$$Li_xCo_{1-y}M_yA_2 \qquad (4)$$

$$Li_xCo_{1-y}M_yO_{2-z}X_z \qquad (5)$$

$$Li_xNi_{1-y}M_yA_2 \qquad (6)$$

$$Li_xNi_{1-y}M_yO_{2-z}X_z \qquad (7)$$

$$Li_xNi_{1-y}Co_yO_{2-z}X_z \qquad (8)$$

$$Li_xNi_{1-y-z}Co_yM_zA_\alpha \qquad (9)$$

$$Li_xNi_{1-y-z}Co_yM_zO_{2-\alpha}X_\alpha \qquad (10)$$

$$Li_xNi_{1-y-z}Mn_yM_zA_\alpha \qquad (11)$$

and $$Li_xNi_{1-y-z}Mn_yM_zO_{2-\alpha}X_\alpha \qquad (12)$$

where $0.9 \leq x \leq 1.1$, $0 \leq y \leq 0.5$, $0 \leq z \leq 0.5$, $0 \leq \alpha \leq 2$; M is at least one element selected from the group consisting of Al, Ni, Co, Mn, Cr, Fe, Mg, Sr, V, and rare earth elements; A is selected from the group consisting of O, F, S, and P; and X is selected from the group consisting of F, S, and P.

* * * * *